US010347166B2

(12) United States Patent
Bae et al.

(10) Patent No.: US 10,347,166 B2
(45) Date of Patent: Jul. 9, 2019

(54) ELECTRONIC DEVICE AND OPERATING METHOD THEREOF

(71) Applicant: Samsung Electronics Co., Ltd., Gyeonggi-do (KR)

(72) Inventors: Jongkon Bae, Seoul (KR); Donghui Kim, Gyeonggi-do (KR); Yohan Lee, Seoul (KR); Dongkyoon Han, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/659,030

(22) Filed: Jul. 25, 2017

(65) Prior Publication Data

US 2018/0033360 A1 Feb. 1, 2018

(30) Foreign Application Priority Data

Jul. 27, 2016 (KR) ........................ 10-2016-0095238

(51) Int. Cl.
*G06F 3/0483* (2013.01)
*G09G 3/20* (2006.01)

(52) U.S. Cl.
CPC ..... *G09G 3/2003* (2013.01); *G09G 2310/027* (2013.01); *G09G 2320/0613* (2013.01); *G09G 2330/021* (2013.01); *G09G 2340/14* (2013.01)

(58) Field of Classification Search
CPC ............ G03F 5/04; G05B 2219/23316; G05B 2219/225279; G05B 2219/25286; G05B 2219/25289; G06F 3/048; G06F 3/0483; G06F 3/1221; G06F 11/2097; G06F 17/30274; G06F 17/30994; G09G 3/2003; G09G 5/024; G09G 2310/027; G09G 2320/0613; G09G 2330/021; G09G 2340/14; G11C 2207/2227
See application file for complete search history.

(56) References Cited

U.S. PATENT DOCUMENTS

| | | | | |
|---|---|---|---|---|
| 8,510,662 B1 * | 8/2013 | Haase | G06F 3/0481 715/746 |
| 8,736,557 B2 * | 5/2014 | Chaudhri | G06F 3/04815 345/173 |
| 2001/0052887 A1 * | 12/2001 | Tsutsui | G09G 3/3648 345/87 |
| 2007/0085840 A1 * | 4/2007 | Asaka | G06F 3/0488 345/173 |
| 2010/0134633 A1 | 6/2010 | Engeli et al. | |
| 2012/0182226 A1 * | 7/2012 | Tuli | G06F 3/0488 345/173 |
| 2013/0076595 A1 * | 3/2013 | Sirpal | G06F 3/1438 345/1.3 |
| 2013/0190977 A1 * | 7/2013 | Onaka | B60K 37/00 701/36 |

(Continued)

FOREIGN PATENT DOCUMENTS

KR 1020100036232 4/2010

*Primary Examiner* — Michael J Eurice
(74) *Attorney, Agent, or Firm* — The Farrell Law Firm, P.C.

(57) ABSTRACT

Disclosed is a method enabling a display driver integrated circuit (DDI) to manage rendering a screen display transition effect during changing of a display mode. The method enables the DDI to render a screen display transition effect, thereby achieving a smooth display mode transition even when the application processor is in an overload condition.

20 Claims, 14 Drawing Sheets

(56) References Cited

U.S. PATENT DOCUMENTS

| | | | | |
|---|---|---|---|---|
| 2014/0143678 | A1* | 5/2014 | Mistry | G06F 3/017 715/746 |
| 2014/0143737 | A1* | 5/2014 | Mistry | G06F 3/0488 715/854 |
| 2015/0062052 | A1* | 3/2015 | Bernstein | G06F 3/0416 345/173 |
| 2015/0116769 | A1* | 4/2015 | Nakagawa | G06F 3/0488 358/1.15 |
| 2015/0160853 | A1* | 6/2015 | Hwang | G06F 3/04883 715/720 |
| 2015/0339801 | A1* | 11/2015 | Sato | H04N 5/23216 345/648 |
| 2016/0328023 | A1* | 11/2016 | Mistry | G06F 3/014 |
| 2017/0084216 | A1* | 3/2017 | Hsiao | G09G 3/20 |

* cited by examiner

ELECTRONIC DEVICE AND OPERATING METHOD THEREOF

PRIORITY

This application claims priority under 35 U.S.C. § 119(a) to a Korean Patent Application filed in the Korean Intellectual Property Office on Jul. 27, 2016 and assigned Ser. No. 10-2016-0095238, the contents of which are incorporated herein by reference.

BACKGROUND

1. Field of the Disclosure

The present disclosure relates generally to an electronic device and operating method thereof, and in particular, to a technique for a display driver integrated (DDI) circuit to manage rendering a screen display transition effect during changing of a display mode.

2. Description of the Related Art

The DDI is an integrated circuit driving a display module that is typically implemented with a liquid crystal display (LCD), a light emitting diode (LED) display, or an organic LED display.

With the recent advent of smartphones equipped with an ultra-high definition display module, however, this typical implementation has become outdated and insufficient. Thus, research has been conducted on the transition between multiple display modes to reduce the power consumption of displays supporting ultra-high definition such as wide quad high definition (WQHD).

Another drawback of the conventional display mode transition technologies is that the screen display transition is not sufficiently smooth because overload of the application processor delays rendering the screen display transition effect during changing of a display mode.

Accordingly, there is a need in the art for a DDI capable of producing high performance with low power consumption.

SUMMARY

The present disclosure has been made to address the above-mentioned shortcomings in the art and to provide the advantages described below.

Accordingly, an aspect of the present disclosure is to provide an electronic device and operating method thereof that is capable of rendering a screen display transition effect during changing of a display mode.

In accordance with an aspect of the present disclosure, an electronic device includes a display driver integrated circuit, and an application processor which transfers at least one of a display mode transition command signal and display data to the display driver integrated circuit, wherein the display driver integrated circuit determines an operation state of the display driver integrated circuit, upon receipt of the display mode transition command signal, while a display panel displays a first image, and controls the display panel to display a screen display transition effect rendered based on the determined operation state, and wherein the display driver subsequently displays a second image, when display mode transition is completed.

In accordance with another aspect of the present disclosure, an operation method of an electronic device includes controlling, at a display driver integrated circuit, a display panel to display a first image, determining, at the display driver integrated circuit, an operation state of the display driver integrated circuit, upon receipt of a display mode transition command signal transferred by an application processor, controlling, at the display driver integrated circuit, the display panel to display a screen display transition effect rendered based on the determined operation state, and controlling, at the display driver integrated circuit, the display panel to display a second image when display mode transition is completed.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
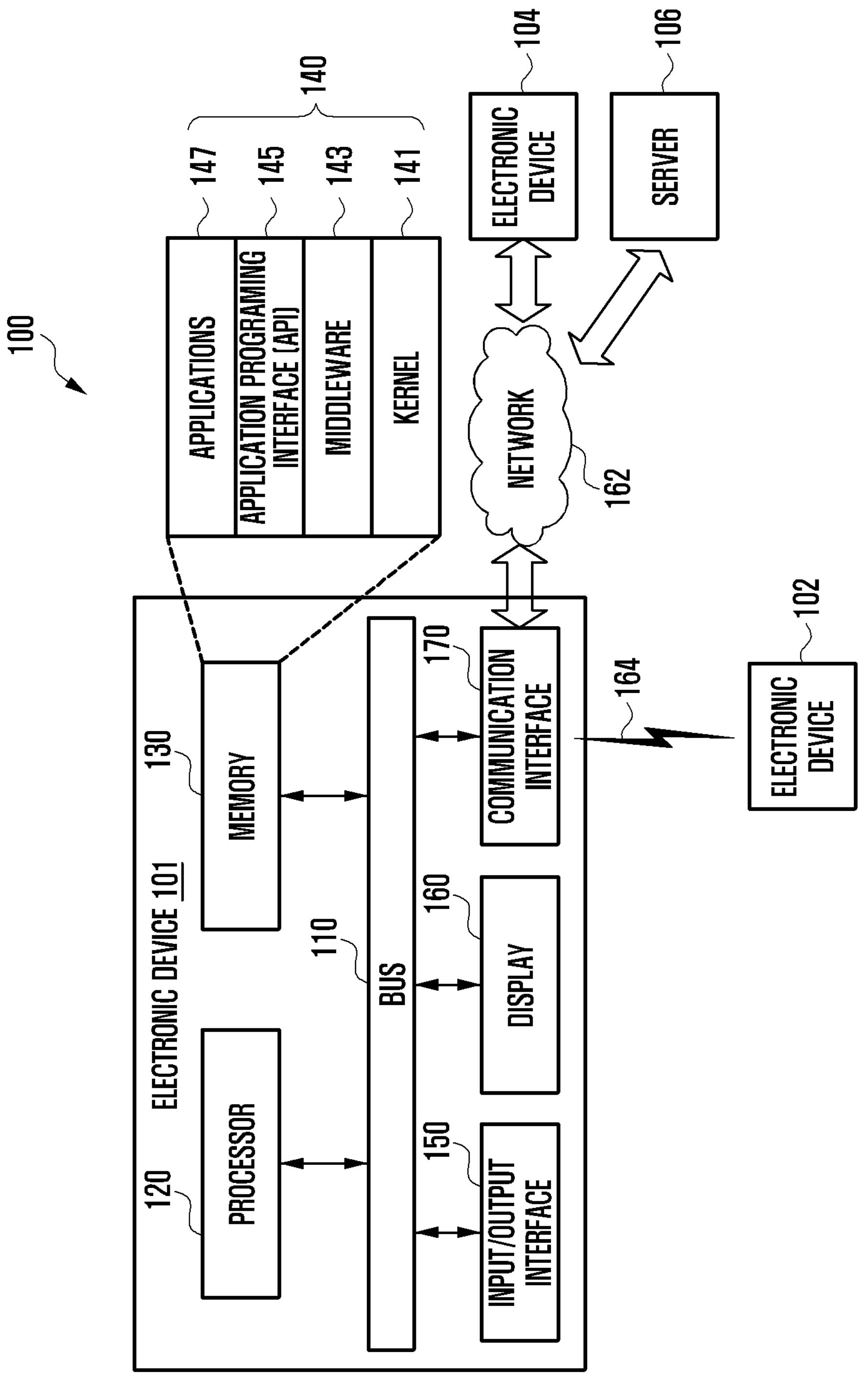
FIG. 1 illustrates a configuration of an electronic device in a network environment according to embodiments of the present disclosure.

The following description is made with reference to the accompanying drawings and is provided to assist in a comprehensive understanding of embodiments of the present disclosure. The description includes various details to assist in that understanding but these are to be regarded as merely examples. Accordingly, those of ordinary skill in the art will recognize that various changes and modifications of the embodiments described herein can be made without departing from the scope and spirit of the present disclosure. In addition, descriptions of well-known functions and constructions may be omitted for the sake of clarity and conciseness.

The terms and words used in the following description and claims are not limited to their dictionary meanings, but may simply be used to enable a clear and consistent understanding of the present disclosure. Accordingly, it should be apparent to those skilled in the art that the following description of embodiments of the present disclosure is provided for illustration purposes only, and not for the purpose of limiting the present disclosure.

It is to be understood that the singular terms "a," "an," and "the" include plural referents unless the context clearly dictates otherwise. For example, reference to "a component surface" includes reference to one or more of such surfaces.

The term "substantially" may generally denote that the recited characteristic, parameter, or value does not need to be achieved exactly, but that deviations or variations, such as tolerances, measurement error, measurement accuracy limitations and other factors known to those skilled in the art, may occur in amounts that do not preclude the effect the characteristic was intended to provide.

Expressions such as "include" and "may include" which may be used in the present disclosure may refer to the presence of the disclosed functions, operations, and constituent elements and do not limit one or more additional functions, operations, and elements. In the present disclosure, terms, such as "include" and/or "have" may be understood to refer to a certain characteristic, number, operation, constituent element, component or a combination thereof, but may not be construed to exclude the existence of or a possibility of addition of one or more other characteristics, numbers, operations, constituent elements, components or combinations thereof.

Furthermore, in the present disclosure, the expression "and/or" includes any and all combinations of the associated listed words. For example, the expression "A and/or B" may include A, may include B, or may include both A and B.

In an example embodiment of the present disclosure, expressions including ordinal numbers, such as "first" and "second," and the like, may modify various elements. However, such elements are not limited by the above expressions. For example, the above expressions do not limit the sequence and/or importance of the elements. The above expressions are used merely for the purpose to distinguish an element from the other elements. For example, a first user device and a second user device indicate different user devices although both of them are user devices. For example, a first element could be referred to as a second element, and similarly, a second element could also be referred to as a first element without departing from the scope of the present disclosure.

When a component is referred to as being "connected" or "accessed" to other component, it should be understood that not only the component is directly connected or accessed to the other component, but also there may exist another component between them. When a component is referred to as being "directly connected" or "directly accessed" to other component, it should be understood that there is no component therebetween.

An electronic device according to the present disclosure may be a device including a communication function, such as a smartphone, a tablet personal computer (PC), a mobile phone, a video phone, an e-book reader, a desktop PC, a laptop PC, a netbook computer, a personal digital assistant (PDA), a portable multimedia player (PMP), a digital audio player, a mobile medical device, an electronic bracelet, an electronic necklace, an electronic accessory, a camera, a wearable device, an electronic clock, a wrist watch, home appliances, such as an air-conditioner, vacuum, an oven, a microwave, a washing machine, and an air cleaner, an artificial intelligence robot, a television (TV), a digital versatile disc (DVD) player, an audio device, various medical devices, such as magnetic resonance angiography (MRA), magnetic resonance imaging (MRI), computed tomography (CT), a scanning machine, and an ultrasonic wave device, a navigation device, a global positioning system (GPS) receiver, an event data recorder (EDR), a flight data recorder (FDR), a set-top box, a TV box (for example, Samsung HomeSync™, Apple TV™, or Google TV™), an electronic dictionary, a vehicle infotainment device, electronic equipment for a ship, such as navigation equipment and a gyrocompass, avionics, a security device, electronic clothes, an electronic key, a camcorder, game consoles, a head-mounted display (HMD), a flat panel display device, an electronic frame, an electronic album, furniture, a portion of a building/structure that includes a communication function, an electronic board, an electronic signature receiving device, or a projector. It will be apparent to those skilled in the art that the electronic device according to the present disclosure is not limited to the aforementioned devices.

According to embodiments of the present disclosure, cores included in the processor of the electronic device may be in one of various states. When a core is in the online state, power is normally supplied to the core which enables the core to normally execute a process.

In the method for operating the electronic device, the following may apply: When a core is in the idle state, power is supplied to the core but the core does not execute a process.

When a core is in the power save state, a power level lower than that of power supplied in the online state is supplied to the core and the core does not execute a process.

When a core is in the offline state, power is not supplied to the core and the cache associated with the core is emptied of stored data. Hence, when a core is in the offline state, the core is unable to execute a process.

When the processor includes a first core and a second core, hot-unplugging (hot-plug out) may refer to transitioning the first core from the online state to the offline state. When the processor includes a first core and a second core, hot-plugging (hot-plug in) may refer to transitioning the first core from the offline state to the online state.

A restriction signal may refer to a command signal causing a core to transition into the power save state so as to place restrictions on the usage of the processor.

A restriction lift signal may refer to a command signal for lifting restrictions on the usage of the processor. That is, the restriction lift signal may cause a core to transition into the online state.

FIG. 1 illustrates electronic devices in a network environment 100 according to embodiments of the present disclosure.

Referring to FIG. 1, an electronic device 101 may include a bus 110, a processor 120 including processing circuitry, a memory 130, an input/output interface 150 including interface circuitry, a display 160, a communication interface 170 including communication circuitry, and other similar and/or suitable components.

The bus 110 may be a circuit that interconnects the above-described elements and delivers a control message between the above-described elements.

The processor 120 may include various processing circuitry and receives commands from the above-described other elements through the bus 110, interprets the received commands, and executes calculation or data processing according to the interpreted commands. Although illustrated as one element, the processor 120 may include multiple processors without departing from the teachings herein.

The memory 130 may store commands or data received from the processor 120 or other elements or generated by the processor 120 or the other elements, and may include programming modules 140, such as a kernel 141, middleware 143, an application programming interface (API) 145, and applications 147. Each of the above-described programming modules may be implemented as software, firmware, hardware, or a combination of two or more thereof.

The kernel 141 may control or manage system resources, such as the bus 110, the processor 120, and the memory 130, used to execute operations or functions implemented by the other programming modules, and may provide an interface capable of accessing and controlling the individual elements of the electronic device 100 by using the middleware 143, the API 145, or the applications 147.

The middleware 143 may interconnect the API 145 or the applications 147 and the kernel 141 in such a manner that the API 145 or at least one of the applications 147 communicates with the kernel 141 and exchanges data therewith. In relation to work requests received from one or more applications 140, the middleware 143 may perform load balancing of the work requests by using a method of assigning a priority, in which system resources of the electronic device 100 can be used, to at least one of the one or more applications 140.

The API 145 is an interface through which at least one of the applications 147 is capable of controlling a function provided by the kernel 141 or the middleware 143, and may include at least one interface or function for file, window, image processing, and character control.

The input/output interface 150 may include various interface circuitry may receive a command or data as input from a user, and may deliver the received command or data to the processor 120 or the memory 130 through the bus 110. The display 160 may display a video, an image, and data to the user.

The communication interface 170 may include various communication circuitry and connect communication between electronic devices 102 and 104 and the electronic device 100. The communication interface 170 may support a short-range communication protocol 164, such as Wi-Fi, Bluetooth (BT), and near field communication (NFC), or a network communication 162, such as the Internet, a local area network (LAN), a wide area network (WAN), a telecommunication network, a cellular network, a satellite network, and a plain old telephone service (POTS). Each of the electronic devices 102 and 104 may be of an identical type as, or a different type than, the electronic device 100. The communication interface 170 may connect communication between a server 106 and the electronic device 100 via the network 162.

Figure 2:
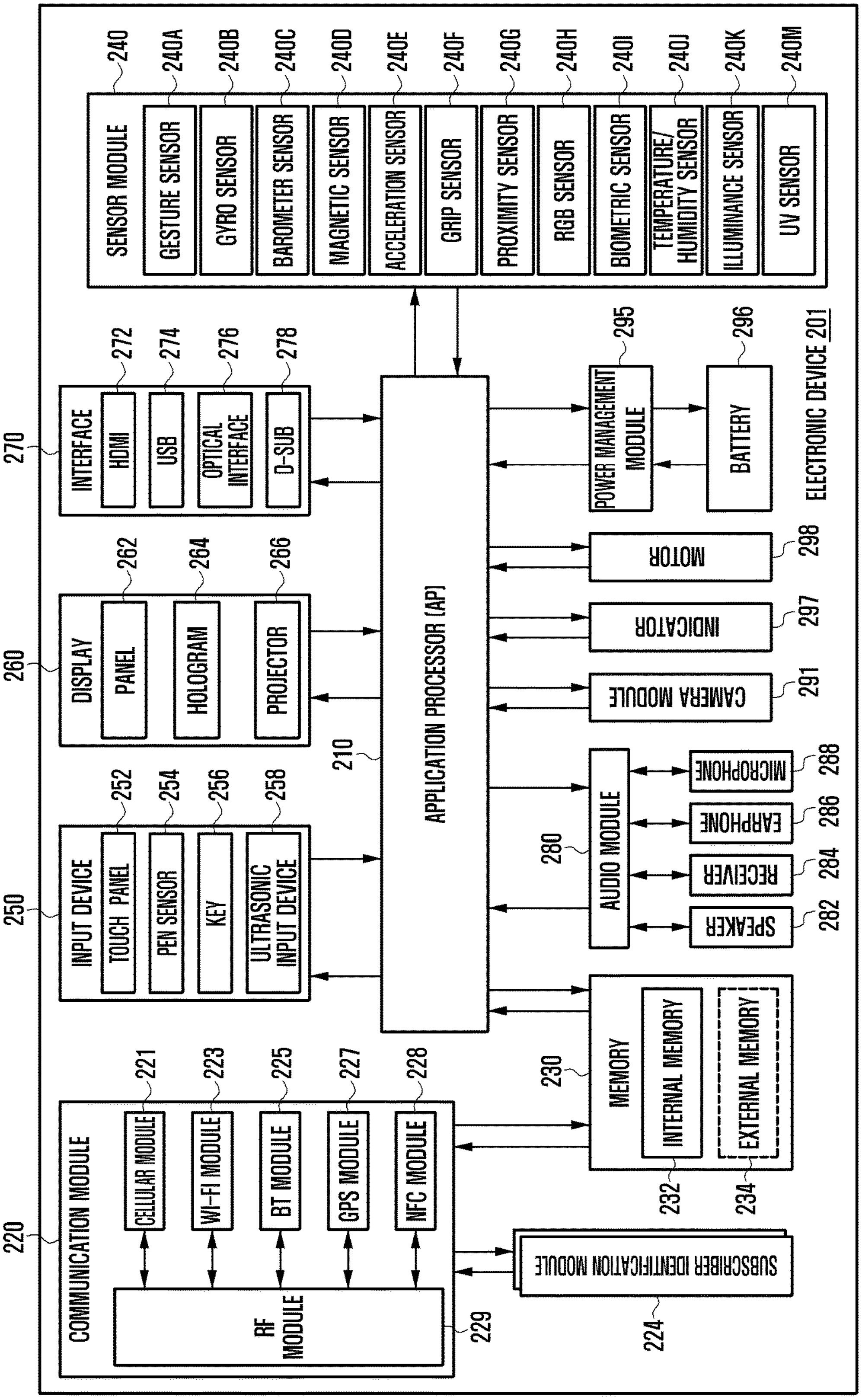
FIG. 2 illustrates a configuration of an electronic device according to embodiments of the present disclosure.

FIG. 2 illustrates an example electronic device according to embodiments of the present disclosure.

Referring to FIG. 2, the electronic device 201 may include a processor 210 and application processor including processing circuitry, a subscriber identification module (SIM) card 224, a memory 230, a communication module 220 including communication circuitry, a sensor module 240, an input device 250 including input circuitry, a display 260, an interface 270 including interface circuitry, an audio module (coder/decoder (codec) 280, a camera module 291, a power management module 295, a battery 296, an indicator 297, a motor 298 and any other similar and/or suitable components.

The processor 210 may include various processing circuitry, such as one or more of a dedicated processor, a CPU, application processors (APs), or one or more communication processors (CPs). The AP and the CP may be included in the processor 210 in FIG. 2, or may be included in different integrated circuit (IC) packages, respectively. According to an embodiment of the present disclosure, the AP and the CP may be included in one IC package.

The AP may execute an operating system (OS) or an application program, and may control multiple hardware or software elements connected to the AP and may perform processing of and arithmetic operations on various data including multimedia data. The AP may be implemented by a system on chip (SoC). According to an embodiment of the present disclosure, the processor 210 may further include a graphical processing unit (GPU).

The CP may manage a data line and may convert a communication protocol during communication between the electronic device including the electronic device 201 and different electronic devices connected to the electronic device through the network. The CP may be implemented by an SoC, may perform at least some of multimedia control functions, may distinguish and authenticate a terminal in a communication network by using the SIM card 224, and may provide the user with services, such as a voice telephony call, a video telephony call, a text message, and packet data.

The CP may control the transmission and reception of data by the communication module 220. In FIG. 2, elements such as the power management module 295 and the memory 230 are illustrated as elements separate from the processor 210. However, according to an embodiment of the present disclosure, the processor 210 may include at least two of the above-described elements.

According to an example embodiment of the present disclosure, the AP or the CP may load, to a volatile memory, a command or data received from at least one of a non-volatile memory and other elements connected to each of the AP and the CP, may process the loaded command or data, and may store, in a non-volatile memory, data received from or generated by at least one of the other elements.

The SIM card 224 may implement a SIM, and may be inserted into a slot formed in a particular portion of the electronic device 201. The SIM card 224 may include unique identification information, such as IC card identifier (ICCID) or subscriber information, such as international mobile subscriber identity (IMSI).

The memory 230 may include an internal memory 232 and/or an external memory 234. The memory 230 may be the memory 130 illustrated in FIG. 1. The internal memory 232 may include at least one of a volatile memory, such as a dynamic random access memory (DRAM), a static RAM (SRAM), and a synchronous dynamic RAM (SDRAM), and a non-volatile memory, such as a one time programmable read only memory (OTPROM), a programmable ROM (PROM), an erasable and programmable ROM (EPROM), an electrically erasable and programmable ROM (EEPROM), a mask ROM, a flash ROM, a not AND (NAND) flash memory, and a not OR (NOR) flash memory. According to an embodiment of the present disclosure, the internal memory 232 may be in the form of a solid state drive (SSD). The external memory 234 may further include a flash drive, such as a compact flash (CF), a secure digital (SD), a micro-SD, a mini-SD, an extreme digital (xD), and a memory stick.

The communication module 220 may include various communication circuitry, such as a radio frequency (RF) module 229, and wireless communication modules, such as a cellular module 221, a Wi-Fi module 223, a BT module 225, a GPS module 227, and/or a NFC module 228, to enable wireless communication through the RF module 229. The wireless communication modules may further include a network interface (e.g., a LAN card) and a modulator/ demodulator (modem) for connecting the electronic device 201 to a network, such as the Internet, a LAN, a WAN, a telecommunication network, a cellular network, a satellite network, or a plain old telephone service (POTS).

The communication module 220 may perform data communication with other electronic devices through a network.

The RF module 229 may be used for transmission and reception of data, such as RF signals or called electronic signals, and may include a transceiver, a power amplifier module (PAM), a frequency filter, a low noise amplifier (LNA), and a component for transmitting and receiving electromagnetic waves in free space in wireless communication, such as a conductor and a conductive wire.

The sensor module 240 may include at least one of a gesture sensor 240A, a gyro sensor 240B, an atmospheric pressure (e.g., barometer) sensor 240C, a magnetic sensor 240D, an acceleration sensor 240E, a grip sensor 240F, a proximity sensor 240G, a red, green and blue (RGB) sensor 240H, a biometric sensor 240I, a temperature/humidity sensor 240J, an illuminance (e.g., light) sensor 240K, and an ultra violet (UV) sensor 240M. The sensor module 240 may measure a physical quantity or may detect an operating state of the electronic device 201, and may convert the measured or detected information to an electrical signal.

Additionally/alternatively, the sensor module 240 may include an electronic nose (E-nose) sensor, an electromyography (EMG) sensor, an electroencephalogram (EEG) sensor, an electrocardiogram (ECG) sensor, a fingerprint sensor, an E-nose sensor, an EMG sensor, an EEG sensor, an ECG sensor, a fingerprint sensor, and a control circuit for controlling one or more sensors included therein. The sensor module 240 may be controlled by the processor 210.

The input device 250 may include various input circuitry, such as a touch panel 252, a pen sensor 254 (e.g., a digital pen sensor), keys 256, and an ultrasonic input device 258. The touch panel 252 may recognize a touch input in at least one of a capacitive, resistive, infrared, and acoustic wave scheme, and may further include a controller. In the capacitive type, the touch panel 252 is capable of recognizing proximity as well as a direct touch. The touch panel 252 may further include a tactile layer that provides a tactile response to the user.

The pen sensor 254 may be implemented by using a method identical or similar to a method of receiving a touch input from the user, or by using a separate sheet for recognition. For example, a key pad or a touch key may be used as the keys 256. The ultrasonic input device 258 enables the terminal to detect a sound wave by using a microphone 288 of the terminal through a pen generating an ultrasonic signal, and to identify data, and is capable of wireless recognition. According to an embodiment of the present disclosure, the electronic device 201 may receive a user input from an external device, such as a network, a computer, or a server, which is connected to the electronic device 201, through the communication module 220.

The display 260 may include a panel 262, a hologram 264, and a projector 266. The panel 262 may be a liquid crystal display (LCD) or an active matrix organic light emitting diode (AM-OLED) display, but the present disclosure is not limited thereto. The panel 262 may be implemented in a flexible, transparent, or wearable form, and may include the touch panel 252 and a module. The hologram 264 may display a three-dimensional image in the air by using interference of light. The projector 266 may include light-projecting elements, such as LEDs, to project light into external surfaces. According to an embodiment of the present disclosure, the display 260 may further include a control circuit for controlling the panel 262, the hologram 264, or the projector 266.

The interface 270 may include various interface circuitry, such as a high-definition multimedia interface (HDMI) 272, a universal serial bus (USB) 274, an optical interface 276, and a d-subminiature (D-sub) 278, and may include a secure digital (SD)/multi-media card (MMC) or infrared data association (IrDA).

The audio module (codec) 280 may bidirectionally convert between a voice signal and an electrical signal. The audio module 280 may convert voice information, which is input to or output from the audio module 280, through a speaker 282, a receiver 284, an earphone 286, or the microphone 288.

The camera module 291 may capture an image and a moving image, and may include one or more image sensors, such as a front or back lens, an image signal processor (ISP), and a flash LED.

The power management module 295 may manage power of the electronic device 201, and may include a power management IC (PMIC), a charger IC, or a battery gauge.

The PMIC may be mounted to an IC or an SoC semiconductor. Charging methods may be classified into a wired charging method and a wireless charging method. The charger IC may charge a battery, and may prevent an overvoltage or an overcurrent from a charger to the battery. According to an embodiment of the present disclosure, the charger IC may include a charger IC for at least one of wired and wireless charging methods. Examples of the wireless charging method may include a magnetic resonance, magnetic induction, or an electromagnetic method. Additional circuits including a coil loop, a resonance circuit, and a rectifier for wireless charging may be added in order to perform the wireless charging.

The battery gauge may measure a residual quantity of the battery 296, or a voltage, a current or a temperature during the charging. The battery 296 may supply power by generating electricity, and may be a rechargeable battery.

The indicator 297 may indicate particular states of the electronic device 201 or a part of the electronic device 201, such as a booting, message, or charging state. The motor 298 may convert an electrical signal into a mechanical vibration.

The electronic device 201 may include a processing unit (e.g., a GPU) for supporting a module TV, which may process media data according to standards, such as digital multimedia broadcasting (DMB), digital video broadcasting (DVB), and media flow. Each of the above-described elements of the electronic device 201 according to an embodiment of the present disclosure may include one or more components, and the name of the relevant element may change depending on the type of electronic device.

The electronic device 201 according to an embodiment of the present disclosure may include at least one of the above-described elements. Some of the above-described elements may be omitted, or electronic device 201 may further include additional elements. Some of the elements of the electronic device 201 may be combined into one entity, which may perform functions identical to those of the relevant elements prior to the combination.

The term "module" used in the present disclosure may refer to a unit including one or more combinations of hardware, software, and firmware. The "module" may be interchangeable with a term, such as "unit," "logic," "logical block," "component," or "circuit". The "module" may be a minimum unit of a component formed as one body or a part thereof, may be a minimum unit for performing one or more functions or a part thereof, and may be implemented mechanically or electronically. For example, the "module" according to an embodiment of the present disclosure may include at least one of a dedicated processor, a CPU, an application-specific integrated circuit (ASIC) chip, a field-programmable gate array (FPGA), and a programmable-logic device for performing certain operations that are known or are to be developed in the future.

Figure 3:
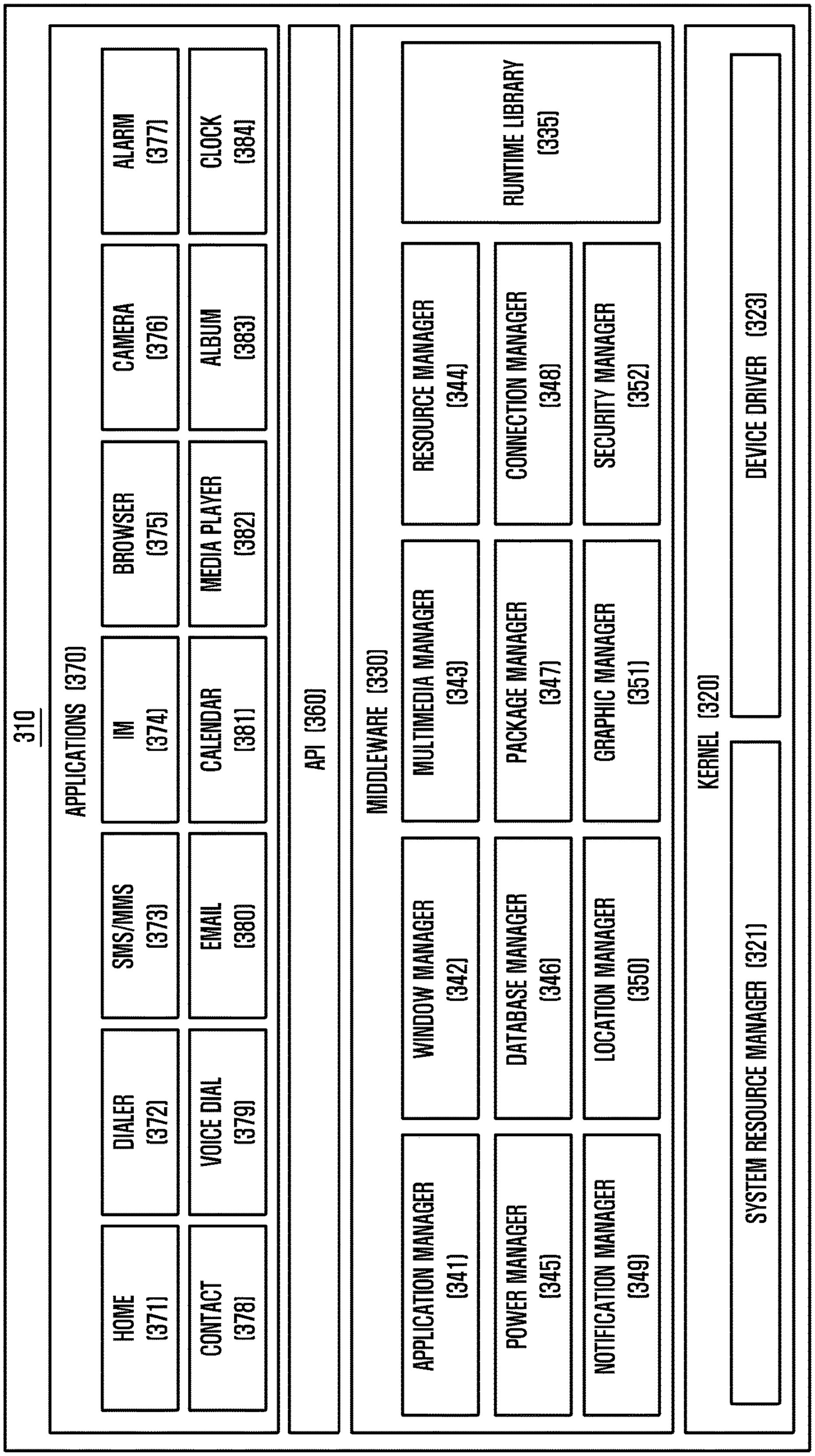
FIG. 3 illustrates a configuration of a program module according to embodiments of the present disclosure.

FIG. 3 illustrates a configuration of a programming module according to an embodiment of the present disclosure.

Referring to FIG. 3, a programming module 310 may be stored in the electronic device 100 or in the electronic device 201 illustrated in FIG. 1. At least a part of the programming module 310 may be implemented in software, firmware, hardware, or a combination of two or more thereof. The programming module 310 may be implemented in hardware, and may include an OS controlling resources related to an electronic device and/or various applications 370 executed in the OS. For example, the OS may be Android, iOS, Windows, Symbian, Tizen, or Bada.

Referring to FIG. 3, the programming module 310 may include a kernel 320, a middleware 330, an API 360, and/or the applications 370.

The kernel 320 may include a system resource manager 321 and/or a device driver 323. The system resource manager 321 may include a process manager, a memory manager, and a file system manager, and may perform the control, allocation, and recovery of system resources. The device driver 323 may include a display driver, a camera driver, a Bluetooth driver, a shared memory driver, a universal serial bus (USB) driver, a keypad driver, a Wi-Fi driver, an audio driver, and an inter-process communication (IPC) driver.

The middleware 330 may include multiple modules previously implemented so as to provide a function used in common by the applications 370. In addition, the middleware 330 may provide a function to the applications 370 through the API 360 in order to enable the applications 370 to efficiently use limited system resources within the electronic device. For example, as illustrated in FIG. 3, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include a library module used by a complier, in order to add a new function by using a programming language during the execution of at least one of the applications 370. According to an embodiment of the present disclosure, the runtime library 335 may perform functions related to input and output, the management of a memory, and an arithmetic function.

The application manager 341 may manage a life cycle of at least one of the applications 370. The window manager 342 may manage graphical user interface (GUI) resources used on the screen. The multimedia manager 343 may detect a format used to reproduce various media files and may encode or decode a media file through a codec appropriate for the relevant format. The resource manager 344 may manage resources, such as a source code, a memory, and a storage space of at least one of the applications 370.

The power manager 345 may operate together with a basic input/output system (BIOS), may manage a battery or power, and may provide power information used for an operation. The database manager 346 may manage a database in such a manner as to enable the generation, search and/or change of the database to be used by at least one of the applications 370. The package manager 347 may manage the installation and/or update of an application distributed as a package file.

The connectivity manager 348 may manage a wireless connectivity, such as Wi-Fi and BT. The notification manager 349 may display or report, to the user, an event, such as an arrival message, an appointment, or a proximity alarm, in a manner that not disturb the user. The location manager 350 may manage location information of the electronic device. The graphic manager 351 may manage a graphic effect, which is to be provided to the user, and/or a user interface related to the graphic effect. The security manager 352 may provide various security functions used for system security and user authentication. According to an embodiment of the present disclosure, when the electronic device has a telephone function, the middleware 330 may further include a telephony manager for managing a voice telephony call function and/or a video telephony call function of the electronic device.

The middleware 330 may generate and use a new middleware module through various functional combinations of the above-described modules, and may provide modules specialized according to types of OSs in order to provide differentiated functions. The middleware 330 may dynamically delete some of the existing elements, or may add new elements. Accordingly, the middleware 330 may omit some of the elements described in the embodiments of the present disclosure, may further include other elements, or may replace the some of the elements with elements which perform a similar function and have a different name.

The API 360 is a set of API programming functions, and may be provided with a different configuration according to an OS. In the case of Android or iOS, one API set may be provided to each platform. In the case of Tizen two or more API sets may be provided to each platform.

The applications 370 may include a preloaded application and/or a third party application, such as a home application 371, a dialer application 372, a short message service (SMS)/multimedia messaging service (MMS) application 373, an instant message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

At least a part of the programming module 310 may be implemented by instructions stored in a non-transitory computer-readable storage medium. When the instructions are executed by one or more processors, the one or more processors may perform functions corresponding to the instructions. At least a part of the programming module 310 may be executed by the processor 210310 and may include a module, a program, a routine, a set of instructions, and/or a process for performing one or more functions.

Names of the elements of the programming module 310 according to an embodiment of the present disclosure may vary depending on the type of OS. The programming module according to an embodiment of the present disclosure may include one or more of the above-described elements. Alternatively, some of the above-described elements may be omitted from the programming module, or the programming module may further include additional elements. The operations performed by the programming module or other elements according to an embodiment of the present disclosure may be processed in a sequential method, a parallel method, a repetitive method, or a heuristic method. In addition, some of the operations may be omitted, or other operations may be added to the operations.

Figure 4A:
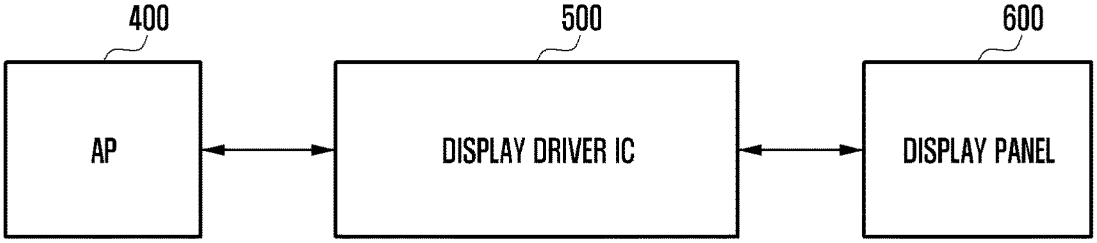
FIG. 4A illustrates a configuration of an electronic device according to embodiments of the present disclosure.

FIG. 4A illustrates a configuration of an electronic device according to embodiments of the present disclosure.

As shown in FIG. 4A, the electronic device includes an AP 400, a DDI 500, and a display panel 600.

The AP 400 may transfer at least one of a display mode transition command signal and display data to the DDI 500.

The display mode transition command signal may request the DDI 500 for display mode transition.

According to embodiments of the present disclosure, the display panel 600 may operate in one of a normal display mode, a display operation standby mode, an upscaling mode, a low power mode, and a display mode-transition standby mode.

The upscaling mode may be a compensating mode for upscaling the display data to enhance image quality.

The low power mode may be an operation mode for reducing power consumption of the electronic device.

The display mode-transition standby mode may be an operation mode waiting for transition to another operation mode when the DDI 500 receives a signal commanding transition from a first display mode to a second display mode.

The display data may be any of all data related to the image to be displayed on the display panel 600. The AP 400 may transfer the data to be displayed on the display panel 600 to the DDI 500.

The DDI 500 may process the display data into an image and output the image to the display panel 600.

The DDI 500 may be implemented as a separate display device including the display panel 600.

The display panel 600 may display the image corresponding to the display data transferred to the DDI 500, and may be implemented in the form of a thin film transistor-liquid crystal display (LCD) panel, a light emitting diode (LED) display panel, an organic LED (OLED) display panel, an active matrix OLED (AMOLED) display panel, or a flexible display panel.

The DDI 500 may determine its operation state upon receipt of the display mode transition command signal transmitted by the AP 400 while outputting a first image to the display panel 600.

The operation state of the DDI 500 may denote its operation mode, such as a normal display mode, a power saving mode-preparation mode, a power saving mode, an upscaling mode, a compression operation mode, and a display mode transition state for the DDI 500 transitioning from the first display mode to the second display mode.

The DDI 500 may control the display panel 600 to display a screen display transition effect based on the state check result.

The screen display transition effect may be achieved by displaying a separate screen during transitioning from the first image to the second image on the display panel 600.

According to embodiments of the present disclosure, the screen display transition effect may be achieved by displaying a screen with a brightness different from that of the first image or a pre-stored screen. The screen display transition effect is further described herein with reference to FIGS. 5A, 5B, 6A, 6B, 7A, and 7B.

The DDI 500 may control the display panel 600 to display the second image upon completion of the display mode transition.

The DDI 500 may control to enter the display mode transition state upon receipt of the display mode transition command signal transmitted by the AP 400.

The DDI 500 determines whether it is in the display mode transition state. If in the display mode transition state, the DDI 500 controls the display panel 600 to display the screen display transition effect.

The DDI 500 may determine its state based on whether a memory write start command is received from the AP 400.

The memory write start command may instruct to write the display data received from the AP 400 to a memory of the DDI 500, which may complete display mode transition in accordance with the receipt of the memory write start command and display data and output the display data to the display panel 600.

If no memory write start command is received, the DDI 500 may control the display panel 600 to display the screen display transition effect, as described in detail with reference to FIGS. 7A and 7B.

Figure 4B:
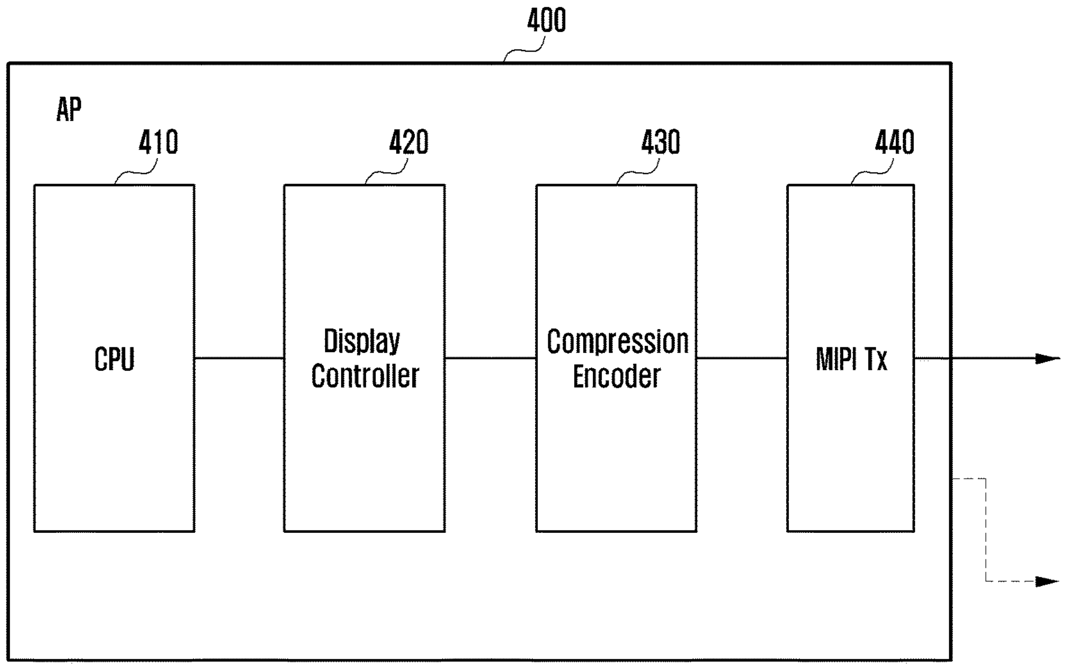
FIG. 4B illustrates a configuration of the AP of FIG. 4A.

FIG. 4B illustrates a configuration of the AP 400 of FIG. 4A according to embodiments of the present disclosure.

The AP 400 may include a central processing unit (CPU) 410, a display controller 420, a compression encoder 430, and a mobile industry processor interface (MIPI) transmission (Tx) terminal 440.

The GPU of the CPU 410 may process an image to be output to the display panel 600.

The CPU 410 may control overall operations of the AP 400, such as managing the functions of the GPU of the CPU 410, which may be implemented as a separate chip from the CPU of the CPU 410 according to a designer's intention.

The display controller 420 may control the DDI 600.

The compression encoder 430 may denote a circuit for compressing data to be transferred from the AP 400 to the DDI 500.

The MIPI Tx terminal 440 may transfer the display data and various command signals from the AP 400 to the DDI 500 in compliance with an MIPI standard. Although the embodiments of FIGS. 4B and 4C comply with the MIPI standard, it may also be possible to configure the terminal to comply with one of various standards such as mobile display digital interface (MDDI), displayport, and embedded displayport, depending on a designer's intention.

Figure 4C:
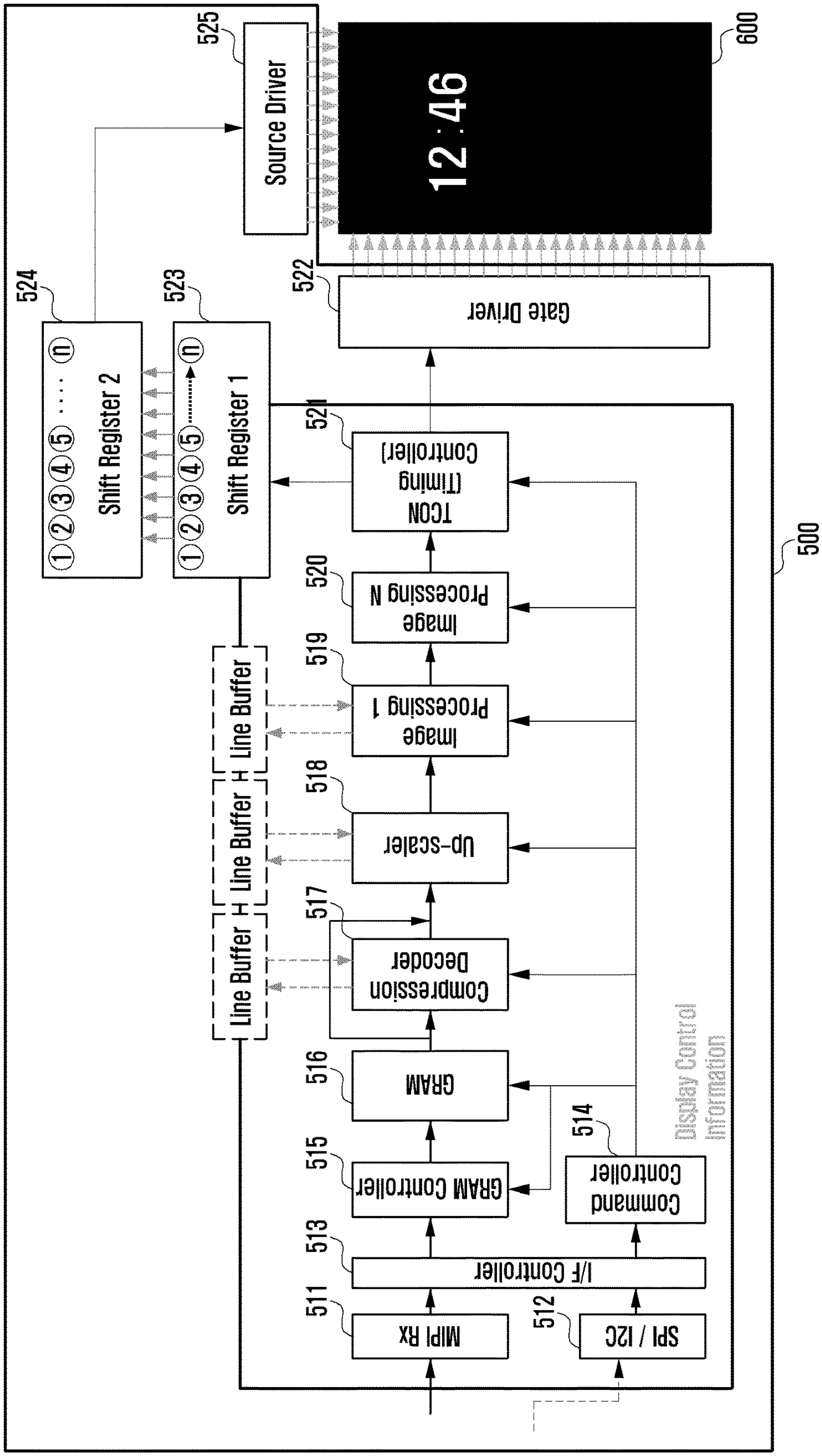
FIG. 4C illustrates a configuration of the DDI of FIG. 4A.

FIG. 4C illustrates a configuration of the DDI 500 of FIG. 4A according to embodiments of the present disclosure.

As shown in FIG. 4C, the DDI 500 may include a MIPI reception (Rx) terminal 511, a serial peripheral interface (SPI)/inter-integrated circuit (I2C) communication terminal 512, an interface controller 513, a command controller 514, a graphic memory controller 515, a graphic memory 516, a compression decoder 517, an up-scaler 518, image processing units 519 and 520, a timing controller (TCON) 521, a gate driver 522, shift registers 523 and 524, and a source driver 525.

The MIPI Rx terminal 511 may receive the display data transferred by the AP 400.

The SPI/I2C communication terminal 512 may receive data corresponding to a command transferred by the AP 400 in compliance with an SPI/I2C communication standard. The SPI/I2C communication terminal 512 may receive a display mode transition command signal from the AP 400.

The interface controller 513 may interface signals and display data between the AP 400 and the DDI 500.

The interface controller 513 may control such that the display data and the display mode transition command signal from the AP 400 are delivered to the graphic memory controller 515 and the command controller 514, respectively.

The graphic memory controller 515 may receive the display data from the interface controller 513 and control such that the display data is written in the graphic memory 516.

The graphic memory 516 may store the display data from the graphic memory controller based on a control signal from the graphic memory controller 515.

The display data stored in the graphic memory 516 may be transferred to the compression decoder 517, which may perform decompression on the display data.

If the display data transferred by the AP 400 is received in a compressed form, the compression decoder 517 may decompress compressed display data.

If the display data transferred by the AP 400 is received in an uncompressed form, it may bypass the compression decoder 517.

The DDI 500 may determine whether the electronic device is operating in an un-compression mode and, if so, control such that the display data bypasses the compression decoder 517.

The display data may be transferred to the up-scaler 518, which may increase the number of pixels included in the image corresponding to the display data. For example, the up-scaler 518 may increase the number of pixels included in a high definition (HD) image as much as required for an equivalent full HD (FHD) image.

The DDI 500 may determine whether the electronic device is operating in an upscaling mode and, if so, control such that the display data bypasses the up-scaler 518.

The image processing units 519 and 520 may process the display data and output the processed display data to the timing controller 521.

At least one of the image processing units 519 and 520 may render the screen display transition effect based on the operation state determination result made by the DDI 500.

The timing controller 521 may generate a synchronization signal or a clock signal to the respective components of the DDI 500, and may also generate a read command (RCMD) for a reading operation of the graphic memory 516 to the graphic memory controller 515.

The synchronization signal or clock signal generated by the timing controller 521 may be used for displaying a tearing effect (TE). The display data may be transferred to the DDI 500 in synchronization with the TE signal.

The timing controller 521 may transfer the display data processed by the image processing units 519 and 520 to the shift registers 523 and 524, which may control such that the display data is sequentially shifted. The shifted display data may be output to the display panel 600 via the source driver 525.

The gate driver 522, which is electrically connected to the timing controller 521, may control the gates of the display panel 600. That is, the source driver 525 and the gate driver 522 may control the operations of the pixels of the display panel 600 such that the display panel 600 displays an image corresponding to the display data from the AP 400 along with the screen display transition effect.

Figure 5A:
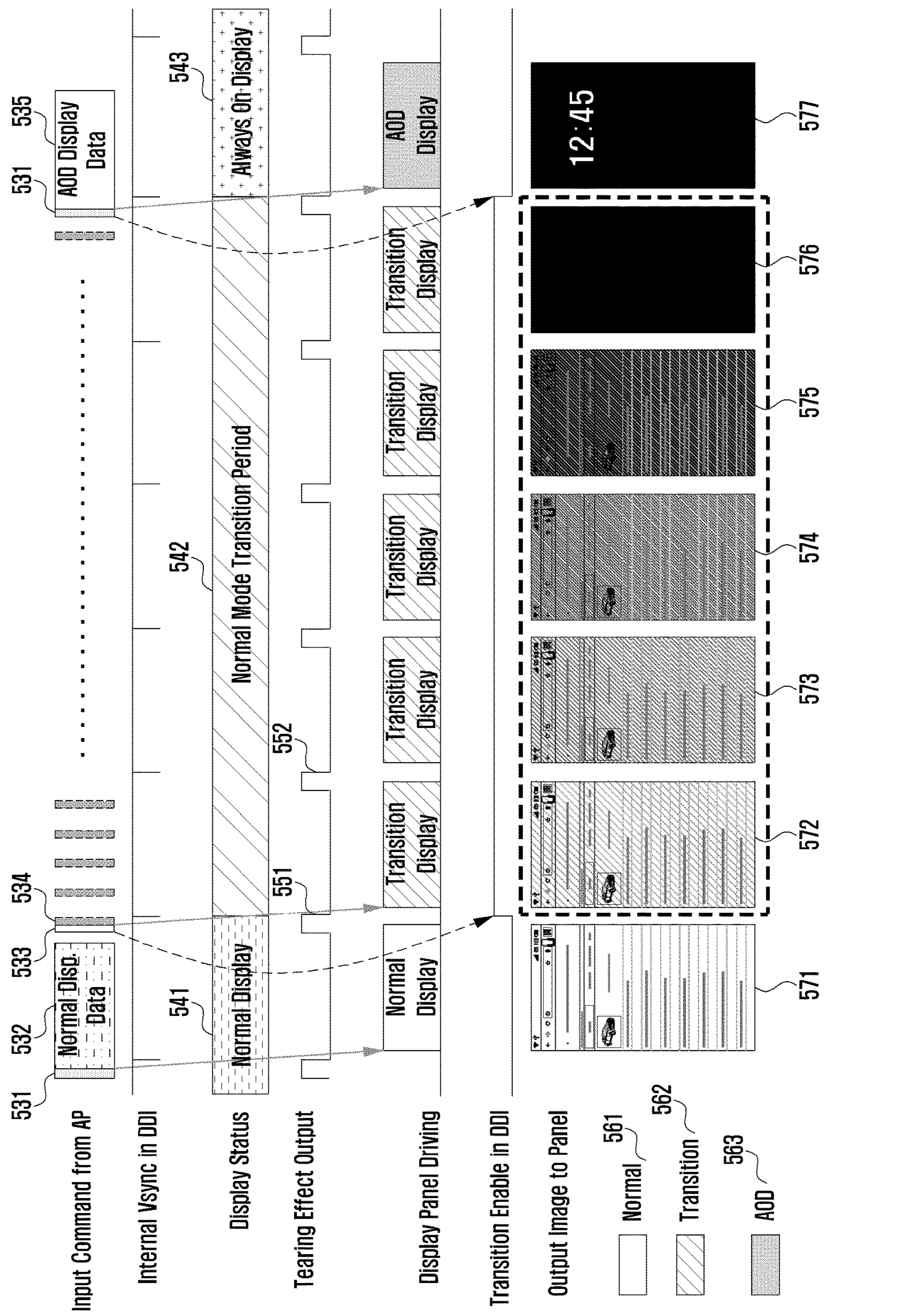
FIGS. 5A and 5B illustrate a process of rendering a screen display transition effect for gradual brightness decrease in an electronic device according to embodiments of the present disclosure.
Figure 5B:
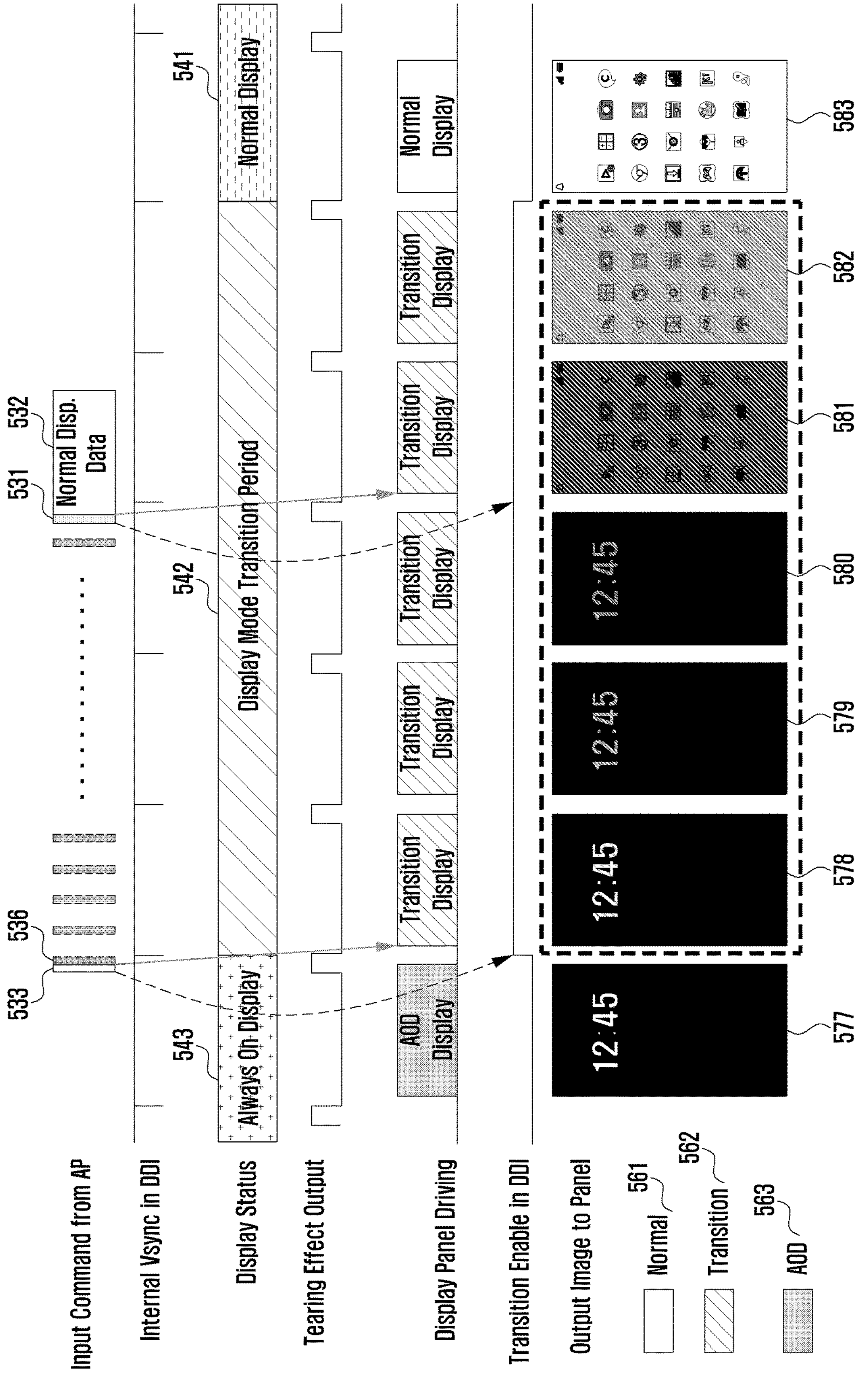

FIGS. 5A and 5B illustrate a process of rendering a screen display transition effect for gradual brightness decrease in an electronic device according to embodiments of the present disclosure.

FIG. 5A depicts when the electronic device transitions from a normal display mode 541 to an always on display (AOD) mode 543.

The AP 400 may transfer a memory write start command 531 and display data 532 to the DDI 500, which may control to write the display data 532 to the graphic memory 516 and output a first image 571 corresponding to the display data 532 to the display panel 600.

The DDI 500 may output the image according to a TE signal corresponding to its internal synchronization signal. In reference to FIG. 5A, the DDI 500 may transfer the display data to the display panel 600 during output of a first TE signal 551 which is output subsequent to the first image 571. The display panel 600 may display an image 572 corresponding to the display data. During output of the TE signal 551, the DDI 500 may transfer the display data to the display panel 600 and, if the display data transfer is completed, the display panel 600 displays the display data.

During display of the first image 571, the AP 400 may transfer a display mode transition command signal 533 and an AOD configuration command signal 534 to the DDI 500 upon detection of the electronic device's transition to the standby mode.

The AOD configuration command signal 534 may include a command for configuring the image displayed in the AOD mode 543, and may be transferred in the display mode transition state 542.

The DDI 500 may determine its operation state upon receipt of the display mode transition command signal 533 from the AP 400.

The DDI 500 may render a screen display transition effect based on its operation state. The DDI 500 may determine its operation state, i.e., display mode transition state 542, and then render the screen display transition effect. The transition mode 562 may be an operation mode waiting for transition to another operation mode when the DDI 500 receives a signal commanding transition from a first display mode (i.e normal mode) to a second display mode (i.e AOD mode), and the AOD mode 563 may be an operation mode for displaying a screen including information on a part of the screen which is turned off.

The screen display transition effect may be rendered in such a manner that the brightness of the first image 571 gradually decreases. The DDI 500 may control to render the screen display transition effect in which the brightness of the first image 571 gradually decreases.

A brightness change effect may be achieved by controlling the amount of electric current input to the display panel 600. According to an embodiment of the present disclosure, the DDI 500 may gradually decrease the brightness of the first image 571 by gradually decreasing the amount of the electric current input to the display panel 600.

A brightness change effect may be achieved by adjusting the red-green-blue (RGB) values of the pixels in the first image 571. The DDI 500 may gradually decrease the brightness of the first image 571 by decreasing the RGB values of the pixels in the first image 571.

It may also be possible to adjust the brightness by combining both of the above methods.

In FIG. 5A, the DDI 500 may control the display panel 600 to display the screen display transition effect in which the brightness of the first image 571 gradually decreases. The display panel 600 may display images 572 to 576 sequentially in the display mode transition state 542 to accomplish the screen display transition effect in which the brightness of the first image 571 gradually decreases.

The DDI 500 may determine its operation state and, if the display mode transition is completed, control such that a second image 577 is displayed. Upon receipt of the memory write start command signal 531 and display data 535, the DDI 500 may control to output the second image 577 corresponding to the display data 535.

FIG. 5B depicts when the electronic device transitions from an AOD mode 543 to a normal display mode 541 via a display mode transition state 542.

The AP 400 may transfer a display mode transition command signal 533 and a normal display mode configuration command signal 536 to the DDI 500 when the electronic device enters the active mode.

The DDI 500 may transition from the AOD mode 543 to the display mode transition state 542 upon receipt of the display mode transition command signal 533.

The DDI 500 may determine whether it is operating in the display mode transition state and, if so, control such that the screen display transition effect is displayed.

The screen display transition effect may be rendered in such a manner that the brightness of the first image 577 is changed gradually as described with reference to FIG. 5A. The DDI 500 may control such that the images 578 to 580 created by gradually decreasing brightness in the first image 577 are displayed sequentially in an ascending order of reference number as shown in FIG. 5B.

If a memory write command signal 531 and display data 532 are received from the AP 400 during output of the screen display transition effect, the DDI 500 may control such that a second image 583 corresponding to the display data 532 is displayed.

Although FIGS. 5A and 5B are directed to the screen display transition effects displayed during transitioning from the normal display mode to the AOD mode, the mode transition is not limited thereto. The DDI 500 may render a screen display transition effect for the display mode transition state between two among a plurality of display modes including the normal display mode and the AOD mode. The DDI 500 may control such that the screen display transition effect is displayed during the transition from the normal display mode to the power saving mode.

Figure 6A:
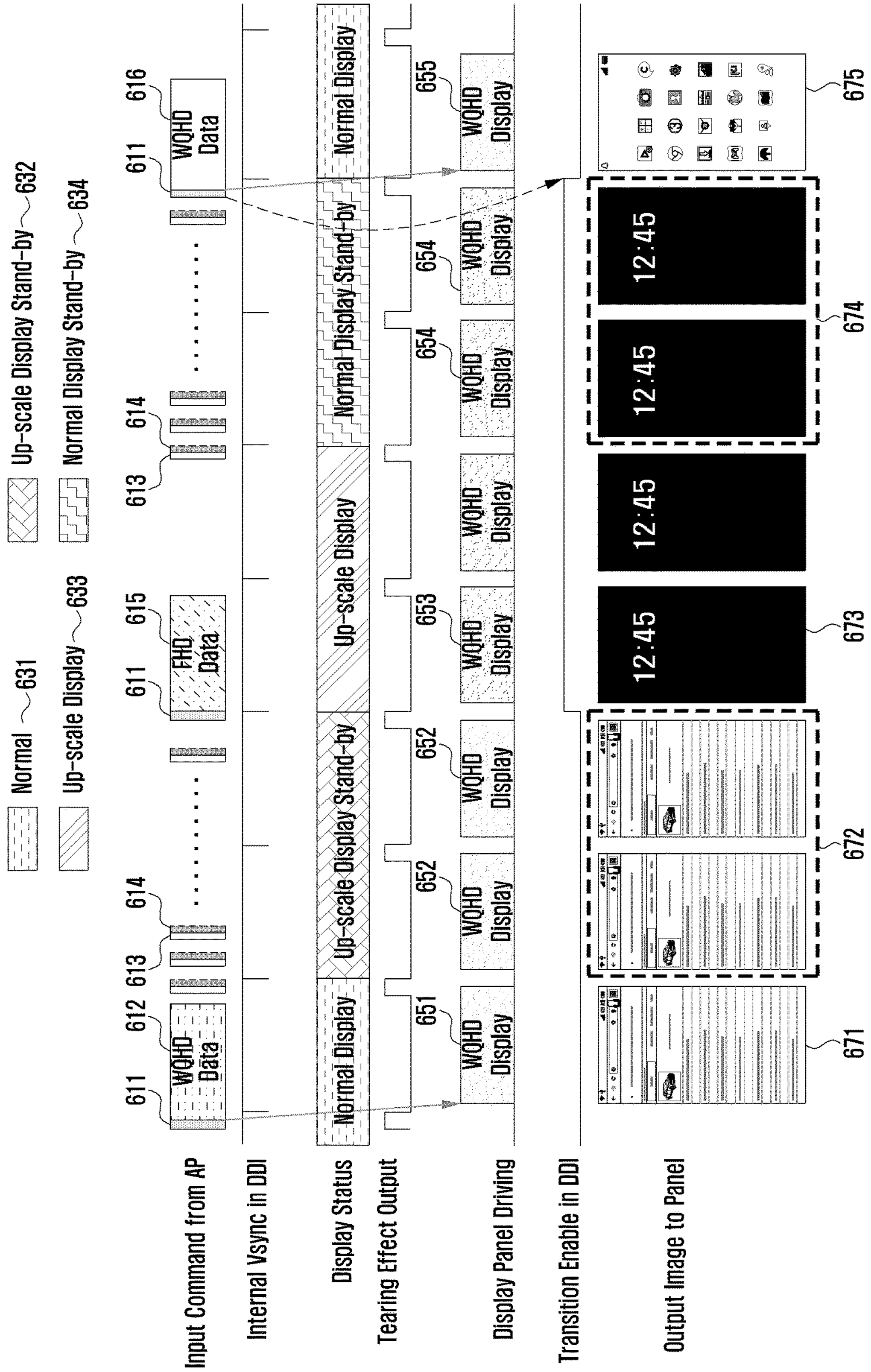
FIGS. 6A and 6B illustrate a process of rendering a screen display transition effect displayed during transition between two display modes according to embodiments of the present disclosure.
Figure 6B:
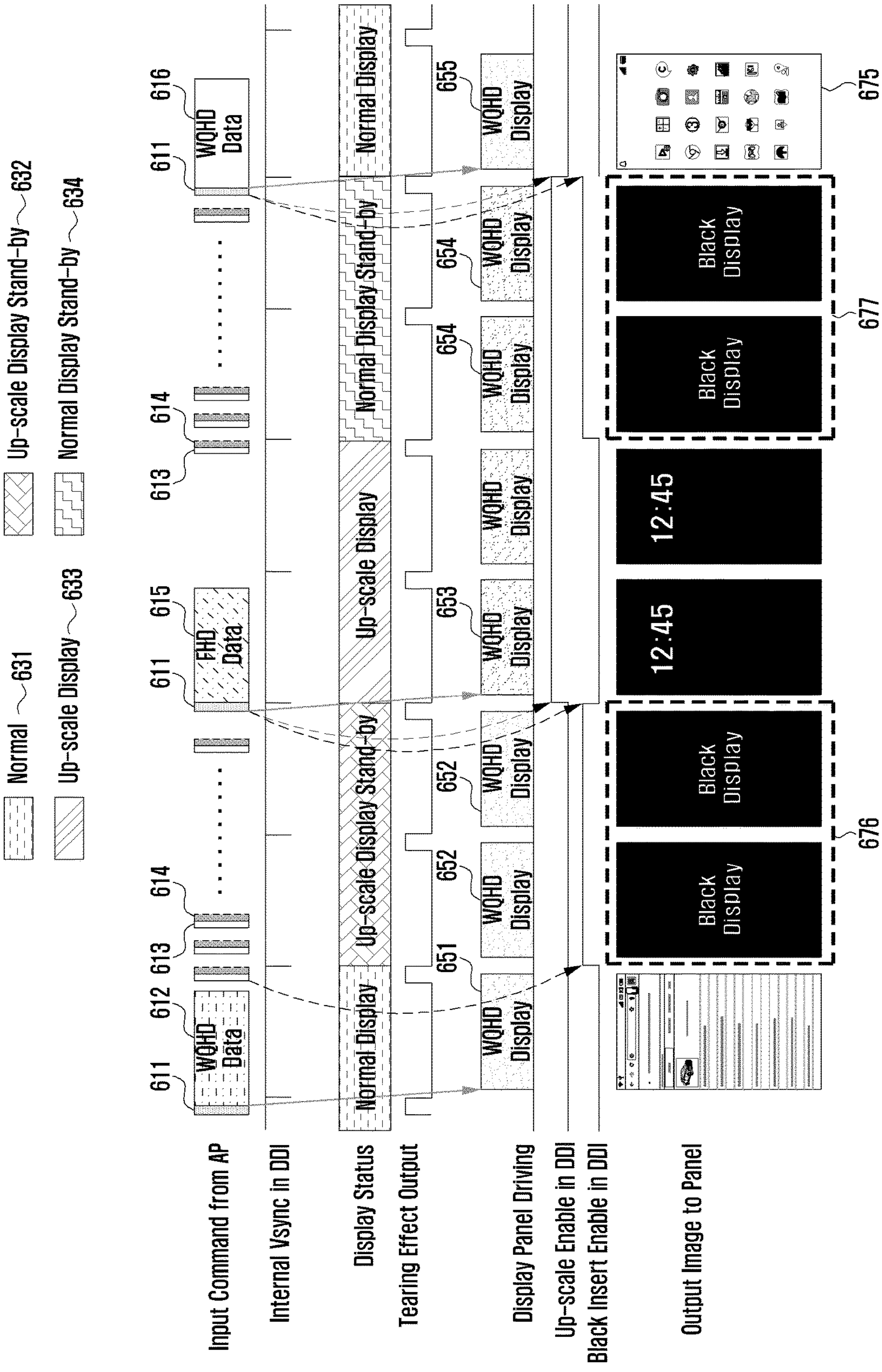

FIGS. 6A and 6B illustrate a process of rendering a screen display transition effect displayed during transition between two display modes according to embodiments of the present disclosure.

Descriptions of the same operations as those made with reference to FIGS. 5A and 5B are omitted herein.

The DDI 500 receives a memory write start command 611 and display data 612 from the AP 400 and outputs a first image 671 corresponding to the display data 612.

The DDI 500 may determine its operation state upon receipt of a display mode transition command 613 for transition from a normal display mode 631 to an upscale display mode 633 and, if it operates in the upscale display mode standby state 632, control such that a screen display transition effect is displayed.

According to an embodiment of the present disclosure, the screen display transition effect may be rendered in such a manner that a pre-stored image is constantly displayed. As shown in FIG. 6A, if it is determined that the current operating state is the upscale display standby state 632, the DDI 500 may control such that the first image 671 is constantly displayed. As shown in FIG. 6B, it may also be possible to control such that a predetermined black screen 676 is displayed.

If the memory write command signal 611 and the display data 615 are received from the AP 400, the DDI 500 may control to transition from the upscale display mode standby state 632 to the upscale display mode 633 and output the second image 673 corresponding to the display data 615.

If the DDI 500 receives the display mode transition command 613 for transition from the upscale display mode 633 to the normal display mode 631, the DDI 500 may determine its operation state, i.e., normal display standby state 634, and control such that a screen display transition effect is displayed.

As described above, the screen display transition effect may be rendered by continuously displaying a pre-stored screen. As shown in FIG. 6A, the DDI 500 may determine its operation state, i.e., normal display mode standby state 634, and continue displaying the same image 674 as the image 673 displayed before receiving the mode transition command signal 613. As shown in FIG. 6B, it may also possible to control such that a predetermined black screen 677 is displayed.

If the memory write command signal 611 and the display data 616 are received from the AP 400, the DDI 500 may control to transition from the normal display mode standby state 634 to the normal display mode 631 and to display a third image 675.

Figure 7A:
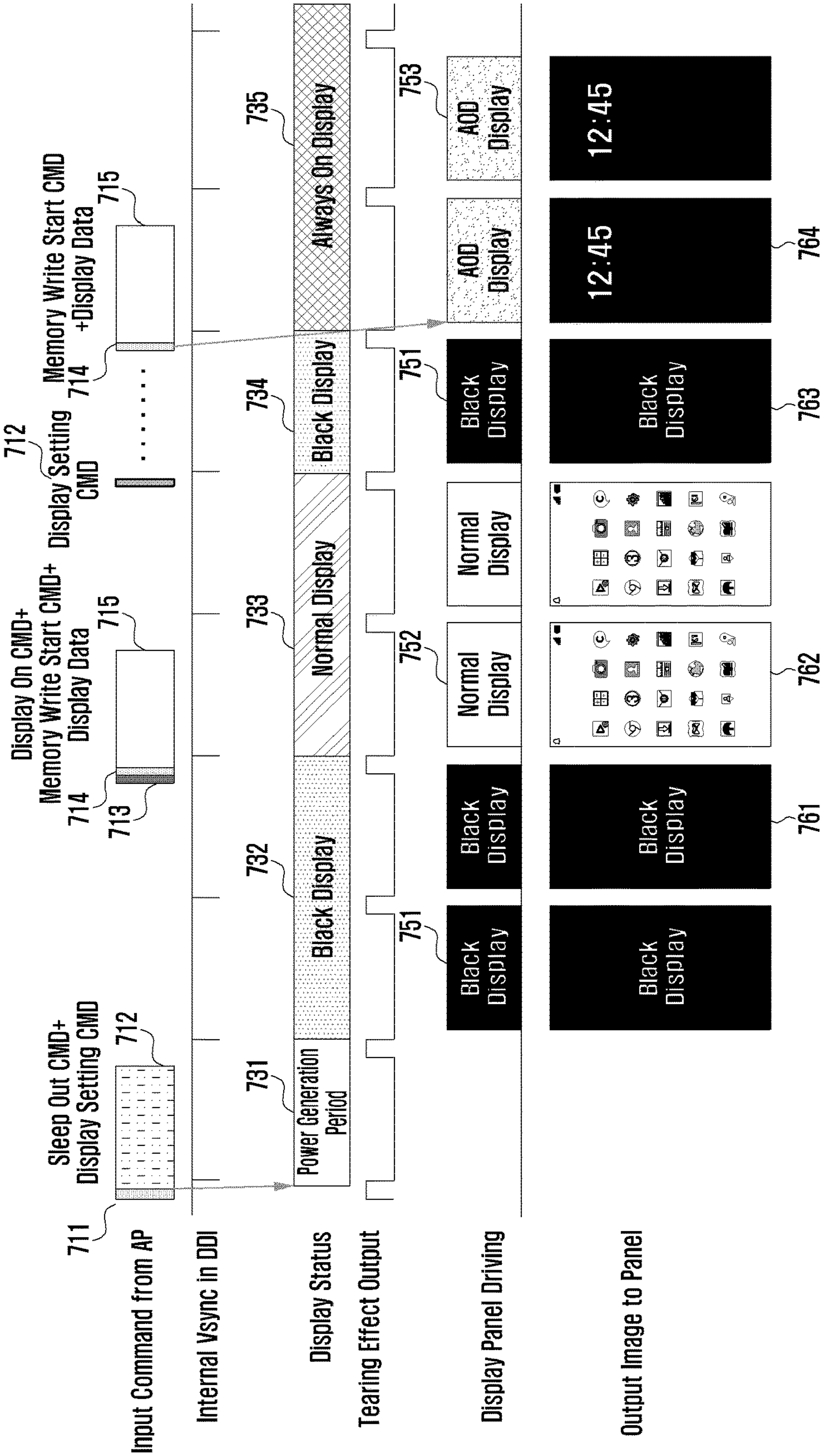
FIGS. 7A and 7B illustrate a process of rendering a screen display transition effect in association with a memory write start command in an electronic device according to embodiments of the present disclosure.
Figure 7B:
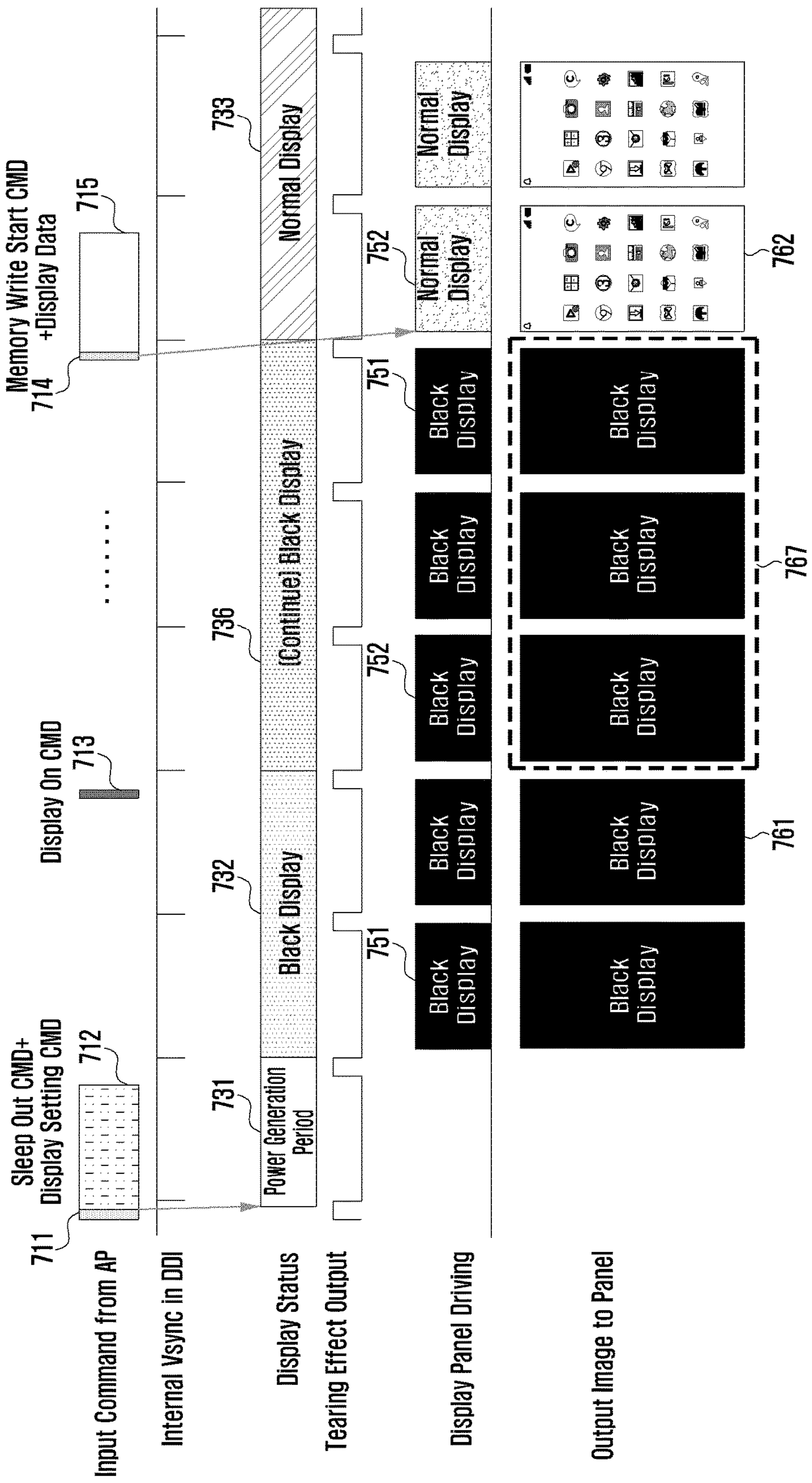

FIGS. 7A and 7B illustrate a process of rendering a screen display transition effect in association with a memory write start command in an electronic device according to embodiments of the present disclosure.

As the electronic device transitions from a standby mode to a normal display mode, the AP 400 may transfer a display mode transition command 711 for transition from the standby mode to the normal display mode and a display configuration command 712 to the DDI 500.

Upon receipt of the display mode transition command 711, the DDI 500 may transition the display status from a power generation state 731 to a black image display state 732 and display a black image 761. The DDI 500 may also receive a display on command 713 and subsequently a memory write command signal 714 and display data 715 and, as a consequence, transition the display status to a normal display mode 733 and output to the display panel 600 an image 762 corresponding to the display data 715.

The DDI 500 may transition the display status from the normal display mode 733 to the black image display state 734 upon receipt of the display setting command 712 associated with the transition from the normal display mode 733 to the AOD mode 735, and control such that the black screen 763 is displayed upon detection of entry into the black image display state 734.

If the memory write start command is received, the DDI 500 may write the display data to the graphic memory. If the DDI 500 receives the display on command 713 signal instead of the memory write start command, there is no display data stored in the graphic memory for output to the display panel, which causes a problem in that an image corresponding to the initial values stored in the graphic memory is output to the display panel 600, resulting in noise on the display panel 600.

The DDI 500 may determine its operation state based on whether the memory write start command signal and display data are received from the AP 400.

In reference to FIG. 7B, if the DDI 500 receives only the display on command 713 and does not receive the memory write start command signal 714 and display data 715, the DDI 500 may control such that a screen display transition effect is rendered. Although FIG. 7B is directed to when a black screen 767 is constantly displayed, it may also be possible to control displaying a predetermined screen without limit thereto.

The following are aspects of an electronic device according to embodiments of the present disclosure, as described herein. The electronic device includes a display driver integrated circuit and an application processor which transfers at least one of a display mode transition command signal and display data to the display driver integrated circuit. The display driver integrated circuit determines its current operation state, upon receipt of the display mode transition command signal, while a display panel displays a first image and controls the display panel to display a screen display transition effect rendered based on the operation state, and to subsequently display a second image when display mode transition is complete.

The display driver integrated circuit determines whether the display driver integrated circuit is in a display mode transition state and, when the display driver integrated circuit is in the display mode transition state, controls the display panel to display the screen display transition effect.

The screen display transition effect includes gradually changing brightness of the first image.

The brightness is adjusted by at least one of controlling an amount of electric current input to the display panel corresponding to the display driver integrated circuit and changing RGB data of the first image.

The screen display transition effect comprises displaying a predetermined image.

The pre-stored image comprises at least one of the first image and a black image.

The display driver integrated circuit determines its operation state based on whether a memory write start command signal is received from the application processor and controls the display panel to display an image corresponding to the display data based on the operation state.

The display driver integrated circuit controls, when neither the memory write start command signal nor the display data corresponding thereto is received, the display panel to display the screen display transition effect.

The screen display transition effect comprises displaying at least one of the first image and a black image.

The display driver integrated circuit controls, if the memory write start command and the display data corresponding to the second image are received while the display panel displays the screen display transition effect, the display panel to display the second image.

Figure 8:
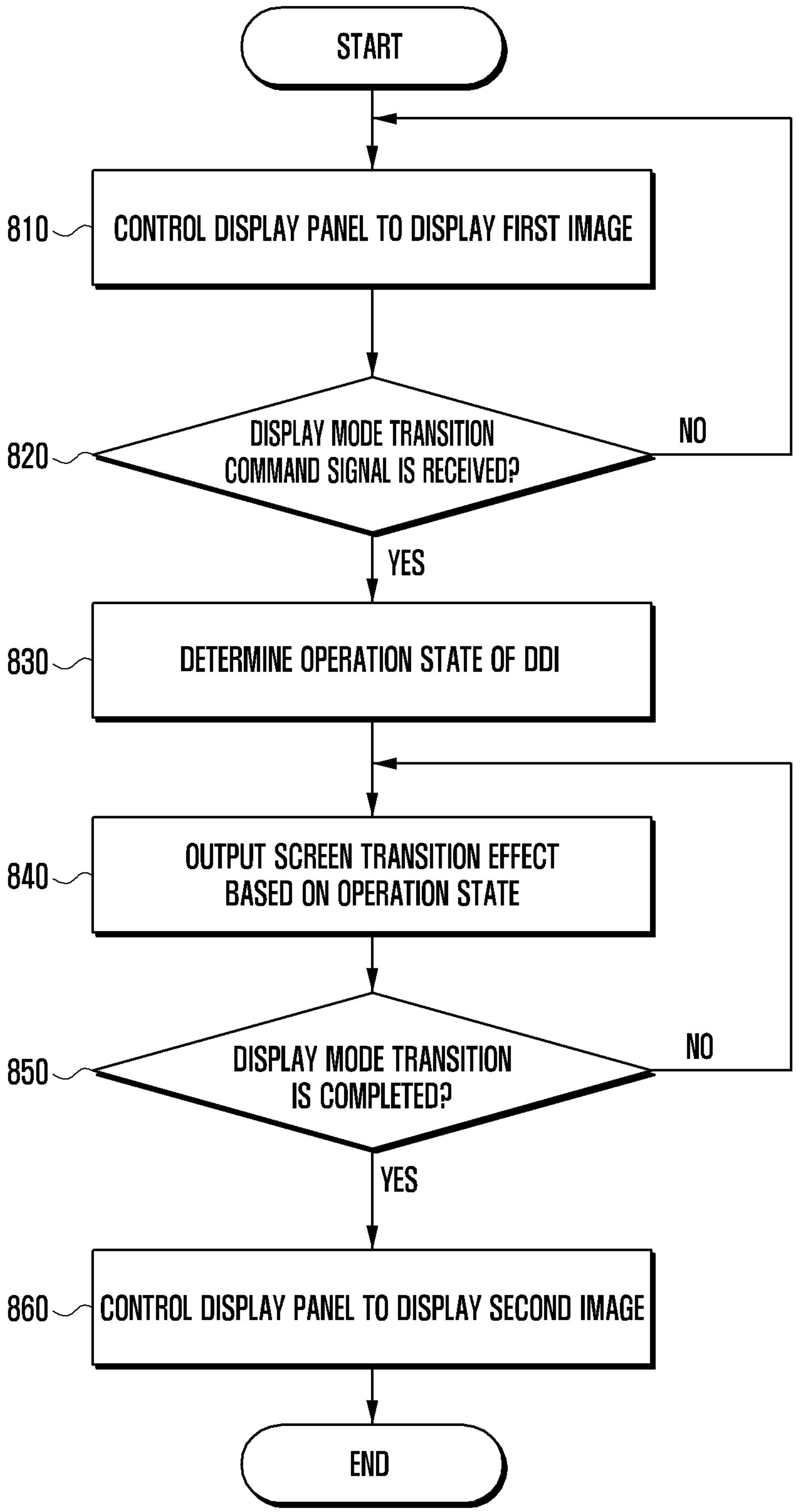
FIG. 8 illustrates an operation method of an electronic device according to an embodiment of the present disclosure.

FIG. 8 illustrates an operation method of an electronic device according to an embodiment of the present disclosure.

In step 810, the DDI 500 may control the display panel 600 to display a first image.

In step 820, the DDI 500 may determine whether a display mode transmission command signal is received from the AP 400.

The display mode transition command signal may be a signal requesting to the DDI 500 for transition to a display mode.

According to embodiments of the present disclosure, the display mode may denote one of a normal display mode, a display operation standby mode, an upscaling mode, a low power mode, and a display mode transition standby mode.

In step 830, if it is determined that the display mode transition command signal is received, the DDI 500 may determine its operation state. If it is determined that the display mode transition command signal is not received, the method returns to step 810.

In step 840, the DDI 500 may output a screen display transition effect based on its operation state.

In step 850, the DDI 500 may determine whether the display mode transition has been completed and, if so, control the display panel 600 to display a second image in step 860. If it is determined that the display mode transition has not been completed, the method returns to step 840.

Figure 9:
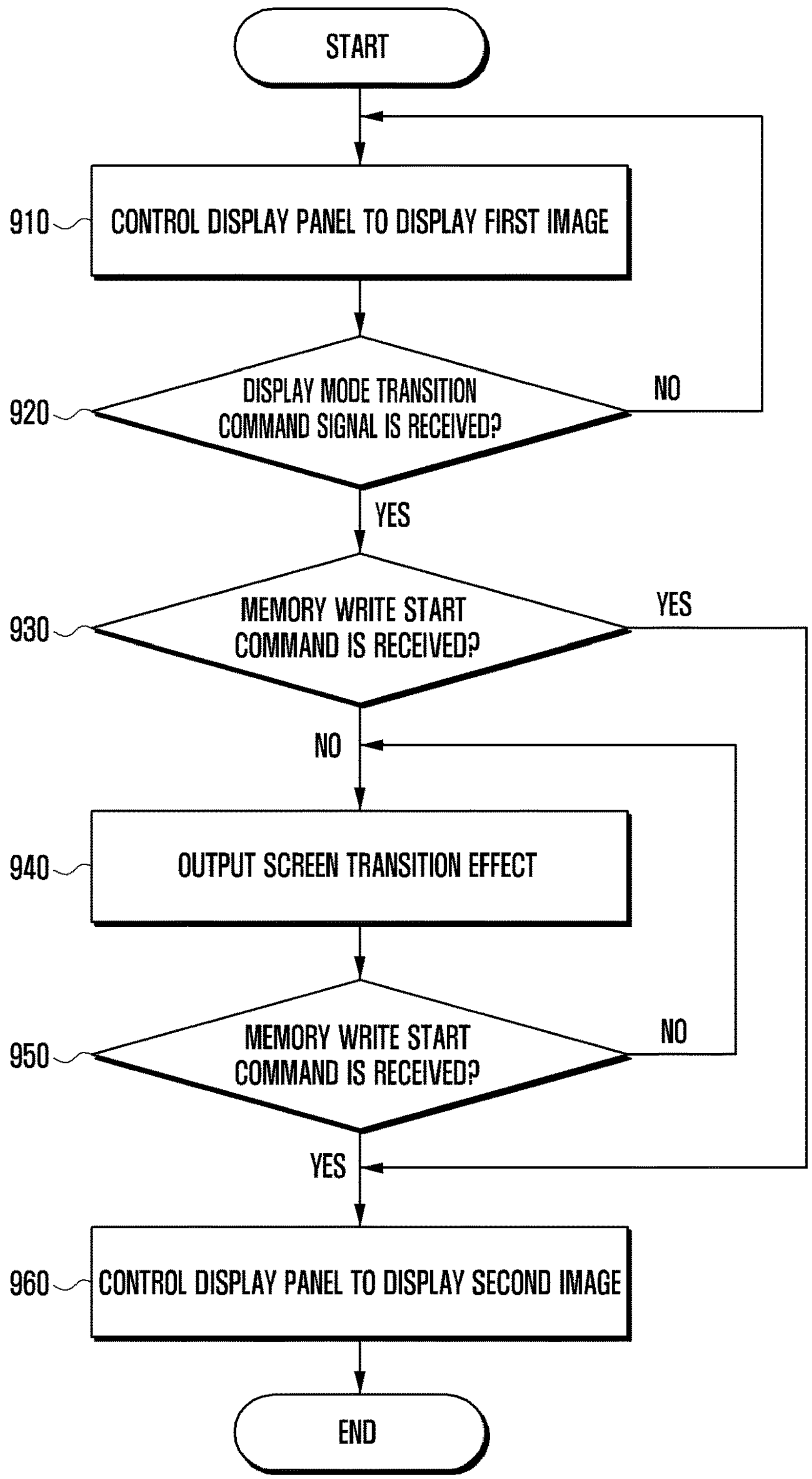
FIG. 9 illustrates an operation method of an electronic device according to another embodiment of the present disclosure.

FIG. 9 illustrates an operation method of an electronic device according to another embodiment of the present disclosure.

In step 910, the DDI 500 may control the display panel 600 to display a first image.

In step 920, the DDI 500 may determine whether a display mode transition command signal is received from the AP 400. If it is determined that the display mode transition command is not received, the method returns to step 910.

In step 930, if it is determined that the display mode transition command signal is received, the DDI 500 may determine whether a memory write start command is received. If it is determined that the memory write start command is received, the method proceeds to step 960 described below.

In step 940, if it is determined that no memory write start command is received, the DDI 500 may output a screen display transition effect.

In step 950, the DDI 500 may determine whether a memory write start command is received during output of the screen display transition effect. If it is determined that the memory write start command signal is not received, the method returns to step 940.

In step 960, if it is determined that a memory write start command signal is received, the DDI 500 may control the display panel 600 to display a second image.

The following are aspects of an operation method of an electronic device according to embodiments of the present disclosure, as describe herein. The operation method includes controlling, at a display driver integrated circuit, a display panel to display a first image, determining, at the display driver integrated circuit, for an operation state of the display driver integrated circuit, upon receipt of a display mode transition command signal transferred by an application processor, controlling, at the display driver integrated circuit, the display panel to display a screen display transition effect rendered based on the operation state, and controlling, at the display driver integrated circuit, the display panel to display a second image when display mode transition is completed.

Controlling the display panel to display the screen display transition effect comprises displaying the screen display transition effect, when the display driver integrated circuit is in a display mode transition state.

The screen display transition effect comprises changing gradually brightness of one of the first and second images.

The brightness is adjusted by at least one of controlling an amount of electric current input to the display panel corresponding to the display driver integrated circuit and changing RGB data of the first image.

The screen display transition effect comprises displaying and maintaining a predetermined image.

The predetermined image comprises at least one of the first image and a black image.

Controlling the display panel to display the screen display transition effect includes determining the operation state based on whether a memory write start command signal is received from the application processor, and controlling the display panel to display an image corresponding to the display data based on the operation state.

Controlling the display panel to display the screen display transition effect includes controlling, when neither the memory write start command signal nor the display data corresponding thereto is received, the display panel to display the screen display transition effect.

The screen display transition effect comprises displaying at least one of the first image and a black image.

Controlling the display panel to display the second image comprises controlling, if the memory write start command signal and the display data corresponding to the second image are received while the display panel displays the screen display transition effect, the display panel to display the second image.

As described above, the electronic device and operating method thereof according to embodiments of the present disclosure enables smooth transition rendering between display modes even when an application processor is in overload, by enabling a DDI to manage rendering a screen display transition effect on behalf of the application processor.

The electronic device and operating method thereof according to embodiments of the present disclosure also protects against a screen fragmentation phenomenon caused by a problem of data transfer from the application processor to the DDI by enabling the DDI to manage rendering a screen display transition effect on behalf of the application processor.

The above-discussed method is described herein with reference to flowchart illustrations, methods, and computer program products according to embodiments of the present disclosure. It will be understood that each block of the flowchart illustrations, and combinations of blocks in the flowchart illustrations, can be implemented by computer program instructions that can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart.

The computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart. The computer program instructions may also be loaded onto a computer or other programmable data processing apparatus to cause a series of operations to be performed on the computer or other programmable apparatus to produce a computer implemented process, such that the instructions that are executed on the computer or other programmable apparatus provide operations for implementing the functions specified in the flowchart.

Each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may be executed concurrently or in reverse order, depending upon the functionality involved.

Aspects of the present disclosure can also be embodied as computer readable code on a non-transitory computer readable recording medium, such as any data storage device that can store data that can be thereafter read by a computer system. Examples of the non-transitory computer readable recording medium include a ROM, a RAM, compact disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

Embodiments of the present disclosure as described above typically involve the processing of input data and the generation of output data to some extent. This input data processing and output data generation may be implemented in hardware or software in combination with hardware. For example, specific electronic components may be employed in a mobile device or related circuitry for implementing the functions associated with the embodiments of the present disclosure as described above.

Alternatively, one or more processors operating in accordance with stored instructions may implement the functions associated with the embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

While the present disclosure has been illustrated and described with reference to embodiments thereof, it will be understood by those skilled in the art that various changes in form and details may be made therein without departing from the spirit and scope of the present disclosure as defined by the appended claims and their equivalents.

What is claimed is:

1. An electronic device comprising:

a display comprising a display panel configured to display an image and a display driver integrated circuit configured to control the display panel; and an application processor configured to transfer at least one of a display mode transition command signal and display data to the display driver integrated circuit, wherein the display driver integrated circuit is further configured to:

in response to receiving the display mode transition command signal, determine an operation state of the display driver integrated circuit while the display panel displays a first image, control the display panel to display a screen display transition effect for a certain time that is variable and is determined based on the operation state of the display driver integrated circuit, and control the display panel to subsequently display a second image corresponding to the display mode transition command signal after displaying the screen display transition effect for the certain time.

2. The electronic device of claim 1, wherein the display driver integrated circuit is further configured to:

determine whether the display driver integrated circuit is in a display mode transition state and, in response to determining that the display driver integrated circuit is in the display mode transition state, control the display panel to display the screen display transition effect.

3. The electronic device of claim 2, wherein the screen display transition effect comprises gradually adjusting a brightness of one of the first and second images.

4. The electronic device of claim 3, wherein the brightness is adjusted by at least one of controlling an amount of electric current input to the display panel corresponding to the display driver integrated circuit and changing red-green-blue (RGB) data of the first image.

5. The electronic device of claim 2, wherein the screen display transition effect comprises displaying a predetermined image.

6. The electronic device of claim 5, wherein the predetermined image comprises at least one of the first image and a black image.

7. The electronic device of claim 1, wherein the display driver integrated circuit is further configured to:

determine the operation state based on whether a memory write start command signal is received from the application processor, and control the display panel to display an image corresponding to the display data based on the determined operation state.

8. The electronic device of claim 7, wherein the display driver integrated circuit is further configured to:

control, in response to identifying that the memory write start command and the display data corresponding to the second image are received while the display panel displays the screen display transition effect, the display panel to display the second image.

9. The electronic device of claim 7, wherein the display driver integrated circuit is further configured to:

control, when neither the memory write start command signal nor the display data corresponding to the screen display transition effect is received, the display panel to display the screen display transition effect.

10. The electronic device of claim 9, wherein the screen display transition effect comprises displaying at least one of the first image and a black image.

11. An operation method of an electronic device, the method comprising:

controlling, by a display driver integrated circuit, a display panel to display a first image;

in response to receiving a display mode transition command signal from an application processor, determining, by the display driver integrated circuit, an operation state of the display driver integrated circuit while the display panel displays the first image;

displaying, by the display panel, a screen display transition effect for a certain time that is variable and is determined based on the operation state of the display driver integrated circuit; and subsequently displaying, by the display panel, a second image corresponding to the display mode transition command signal after displaying the screen display transition effect for the certain time.

12. The method of claim 11, wherein displaying the screen display transition effect comprises displaying the screen display transition effect, when the display driver integrated circuit is in a display mode transition state.

13. The method of claim 12, wherein displaying the screen display transition effect comprises gradually adjusting a brightness of one of the first and second images.

14. The method of claim 13, wherein the brightness is adjusted by at least one of controlling an amount of electric current input to the display panel corresponding to the display driver integrated circuit and changing red-green-blue (RGB) data of the first image.

15. The method of claim 12, wherein displaying the screen display transition effect comprises displaying a predetermined image while the display driver integrated circuit is in a display mode transition state.

16. The method of claim 15, wherein the predetermined image comprises at least one of the first image and a black image.

17. The method of claim 11, wherein displaying the screen display transition effect comprises:

determining the operation state based on whether a memory write start command signal is received from the application processor; and controlling the display panel to display an image corresponding to the display data based on the determined operation state.

18. The method of claim 17, wherein displaying the second image comprises:

displaying the second image, if the memory write start command signal and the display data corresponding to the second image are received while the display panel displays the screen display transition effect.

19. The method of claim 17, wherein displaying the screen display transition effect comprises displaying the screen display transition effect, when neither the memory write start command signal nor the display data corresponding to the screen display transition effect is received.

20. The method of claim 19, wherein the screen display transition effect comprises displaying at least one of the first image and a black image.

* * * * *